United States Patent [19]
Fox

[11] 3,985,018
[45] Oct. 12, 1976

[54] CONTAINER SEAL PROVER
[75] Inventor: Kenneth W. Fox, Bellingham, Wash.
[73] Assignee: Lawrence Peska Associates, Inc., New York, N.Y. ; a part interest
[22] Filed: Aug. 28, 1975
[21] Appl. No.: 608,777

[52] U.S. Cl. .................................. 73/52; 33/169 B
[51] Int. Cl.² .......................................... G01M 3/36
[58] Field of Search ................... 73/52, 45.4, 49.3; 209/80; 33/169 B; 116/114 C

[56] References Cited
UNITED STATES PATENTS

| | | | |
|---|---|---|---|
| 1,340,473 | 5/1920 | Birkenbeuel | 33/169 B |
| 2,355,051 | 8/1944 | Braucher | 73/52 X |
| 2,445,176 | 7/1948 | Hoffman | 73/52 UX |
| 3,736,899 | 6/1973 | Manske | 73/52 X |
| 3,880,749 | 4/1975 | Ramsay | 73/52 X |

*Primary Examiner*—Jerry W. Myracle
*Assistant Examiner*—Joseph W. Roskos

[57] ABSTRACT

Apparatus is disclosed for testing the seal of a container, especially a container used for the storage of foods. Metal cans that contain preserved foods are sealed by lids that are pulled inward toward the can after the canning process is completed properly and the can is sealed. When the can is unsealed, such as for example, by a can opening apparatus the can lid bulges outward. Absent this outward movement, the contents of the can would not be considered fit for consumption. The apparatus comprises a base that is positioned next to a container and has associated therewith a member extendable to a wall of a sealed container that is responsive to the bulging and contracting of the wall when the container is unsealed. An indicator member is operably engaged by the member extendable to the wall of the container to indicate whether the container wall has contracted or bulged upon unsealing the container.

9 Claims, 3 Drawing Figures

CONTAINER SEAL PROVER

SUMMARY OF THE INVENTION

The present invention relates to apparatus for detecting a change in the bulging or contracting of a sealed container when the container is unsealed and comprises a base which is mountable next adjacent the wall of a container; a member extendable from the base to a wall of such container and responsive to the bulging and contracting movement of such wall when the container is unsealed; indicator means affixed to the base for indicating the movement of such wall, the indicator being operably engaged by the member extendable from the base. The apparatus is preferably positioned next to the end wall or lid of a steel or aluminum container for food products and may be mounted on a can opener apparatus for opening such containers. Since the wall or lid of the container contracts after the container has been packed, sealed and cooled the wall or lid bulges when the seal is broken and as such indicates that the contents are safe for consumption. Contracting movement or no movement of the container wall or lid when the container is opened indicates that the contents of the container may be spoiled. Measurement of the movement of the container wall is thereby utilized as an indication of the condition of the contents of the can.

DETAILED DESCRIPTION

Figure 1:
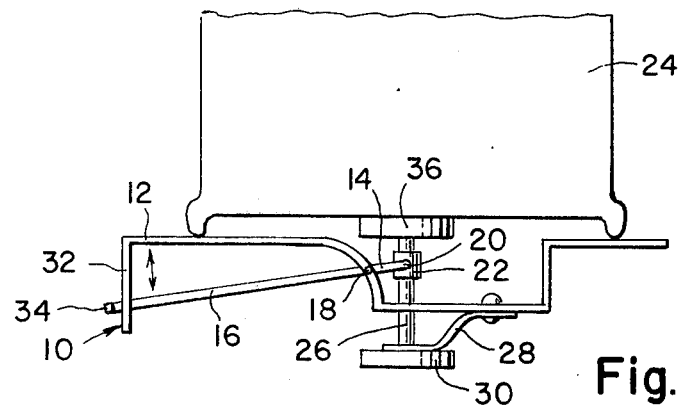
FIG. 1 is a side elevation is section illustrating one embodiment of the apparatus of the present invention operably engaging the bottom wall of a container.

Food items that are packed in metal containers by heating or sterilizing prior to sealing may become spoiled in the container due to many causes, one common cause being improper sealing of the container, another being improper sterilization of the food which results in bacterial or other micro-organism growth in the container. Because an air space is left over the top of the food in the container prior to sealing, food when put into a container when warm tends to heat this air space prior to sealing. A container lid is then sealed to the container and the food in the container is further processed by heating in an autoclave, after which it is removed, cooled to room temperature and ready for use. Upon cooling a vacuum is drawn on the container due to the contraction of the heated air space between the food and the upper wall or lid of the container. This vacuum causes the lid and/or side walls of the container to contract or move inward toward the center of the container. When the container is unsealed, air will rush into the space above the food contents giving off a hissing sound and the walls of the container will bulge out, thereby indicating that the condition of the food within the can is fit for consumption. When the walls don't bulge outwardly upon unsealing the container it indicates that air has leaked into the container and that the contents may be spoiled. The walls of the container bulging outwardly prior to unsealing indicate that bacteria or other micro-organisms have developed in the container because sterilization was ineffective. Walls that have bulged for this reason will move inwardly when the seal of the container is broken again accompanied by a slight hissing sound but in this instance due to air or gasses rushing out of the container. Because air or gas rushing in or out of the can may be inaudible to some people and because in one instance this sound is an indication of the acceptability of the contents of the container and in another instance it is a sign that the contents have spoiled, it cannot be used with confidence as an indicia that the contents are fit for consumption.

Container manufacturers have designed the lids of the containers to contract inwardly toward the center of the container when packed and sealed in the manner described above; however, this inward contraction or movement is so slight that it is difficult for many people to detect any opposite movement or lack of movement in the container lid when the container is unsealed.

It is therefor an object of the present invention to overcome these and other difficulties encountered in the prior art.

It is a further object of the present invention to provide apparatus for detecting a change in the bulging or contracting, if any, of a sealed container when the container is unsealed.

It is also an object of the present invention to provide an indicator on apparatus for detecting a change in the bulging or contracting, if any, of a sealed container, especially an indicator that can be adjusted to a zero point.

It is a further object of the present invention to provide apparatus for detecting a change in the bulging or contracting, if any, of a sealed container wherein such apparatus is readily mountable on a container opener.

These and other objects have been achieved according to the present invention and will become apparent by referring to the disclosure and claims that follow as well as the appended drawings.

Figure 2:
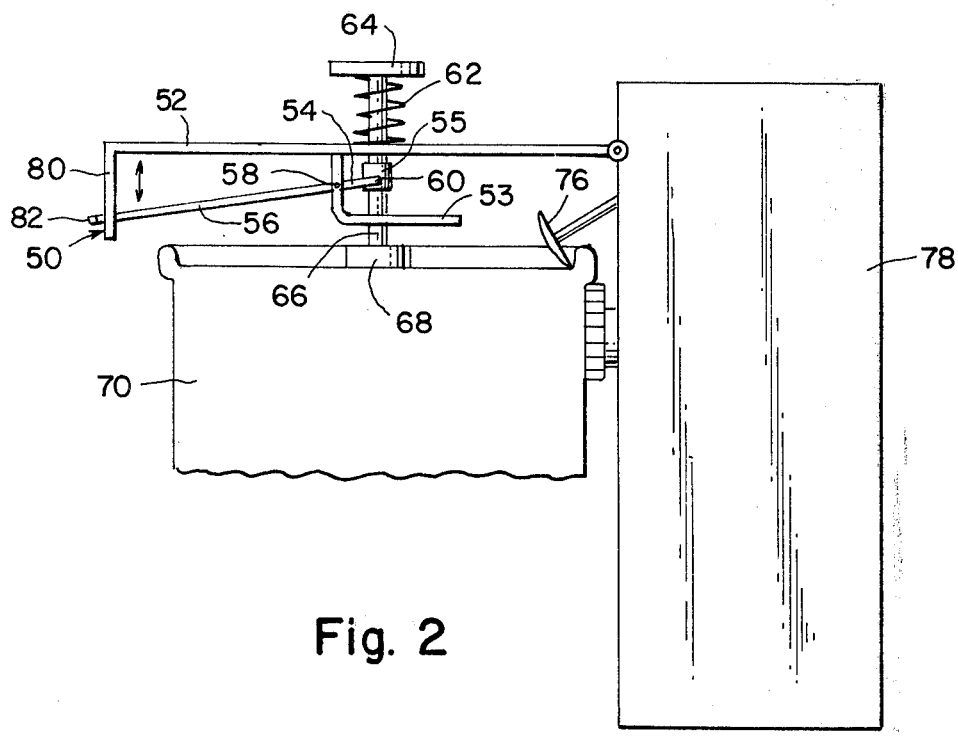
FIG. 2 is another side elevation in section illustrating another embodiment of the present invention operably engaging the top wall or lid of a container, the apparatus being affixed to a container opening device.
Figure 3:
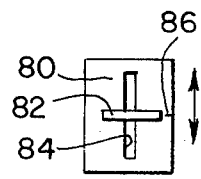
FIG. 3 is an end view of the indicator shown in FIG. 2.

Referring to FIGS. 1 through 3 apparatus 10 and 50 are shown for detecting a change in the bulging or contracting if any, of a container. In FIG. 1 a base 12 has first lever arm 14 and second lever arm 16 pivotally attached thereto at fulcrum 18, said arm 12 and arm 14 being joined at fulcrum 18. A plunger 26 having a finger button 30 at one end thereof and a magnet 36 at the other end thereof is pivotally attached to arm 14 through pivot 20 secured to a sleeve 22 that slidingly and clampingly engages plunger 26. A resilient member comprising leaf spring 28 is provided to resiliently urge plunger 26 toward the bottom wall of container 24. An indicator 34 is provided on arm 16 to register on stop 32 extending downward from base 12.

In FIGS. 2 and 3 the apparatus of the present invention is illustrated attached to an automatic can opener 78 and comprises a base 52 having a fulcrum supporting member 53 extending therefrom, a first lever arm 54 and a second lever arm 56 joined to each other at fulcrum 58 and pivotally attached to member 53 at fulcrum 58. A plunger 66 having a finger button 64 at one end thereof and a magnet 66 at the other end thereof is pivotally attached to arm 54 through pivot 60 secured to a sleeve 55 that slidingly and clampingly engages plunger 68. A resilient member comprising coil spring 62 is provided to resiliently urge plunger 66 toward the top wall or lid of container 70. An indicator 82 is provided on arm 56 to register on stop 80 extending downward from base 52, said indicator riding in slot 84 and being adjustable through sleeve 55 to register at zero point 86 on stop 80 when container 70 is positioned on opener 78 prior to breaking the seal on container 70.

In use container 70 is positioned on opener 78 and the apparatus 50 hingedly secured to opener 78 is swung down to align the base 52 next adjacent to the top wall or lid of container 70. Sleeve 55 is moved upward or downward until indicator 82 is adjusted to the zero point 86 on stop 80. Spring 62 holds plunger 55 in engagement with the lid of container 70 but does not exert force greater than that necessary to maintain such contact and to hold plunger 66 against the lid of container 70 so that the apparatus of the present invention will register any movement due to the lid of container 70 either bulging or contracting after the seal of container 70 is broken. Spring 62 as well as spring 28 may be dispensed with in the construction of the apparatus and only magnets 36 or 68 used to hold plungers 26 and 66 respectively on the container walls such as the container lids if such lids or container walls are made from a material that is magnetically attracted such as a ferrous material.

Wheel 76 is then forced into the container lid to break the seal thereof whereupon the lid will bulge slightly if the container has been properly sealed and sterilized. The indicator 82 will accordingly move down in slot 84 indicating that the contents are safe. If the indicator does not move, it is a sign that the can was not properly sealed and similarly if the indicator 82 moves up from the zero point.

Although the invention has been described by reference to some embodiments it is not intended that the novel apparatus be limited thereby, but that some modifications are intended to be included as falling within the broad spirit and scope of the foregoing disclosure, the following claims and the appended drawing.

What is claimed is:

1. Apparatus for detecting a change in the bulging or contracting of the wall of a sealed container when the container is unsealed comprising base means mountable next adjacent the wall of a container, (The apparatus of claim 1 comprising), fulcrum means extending from said base, lever means comprising a first lever arm means and a second lever arm means joined to each other at said fulcrum and pivotally secured to said fulcrum, container wall contacting means responsive to bulging and contracting of the walls of a sealed container when said container is unsealed, said container wall contacting means operably connected to said first lever arm for amplifying said bulging or contracting or said container wall through said second lever arm, indicator means affixed to said base for indicating the movement of said second arm responsive to said bulging and contracting.

2. The apparatus of claim 1 where said container wall contacting means comprises plunger means.

3. The apparatus of claim 2 where said plunger is joined to said first lever arm through securing means that slidingly and clampingly engage said plunger for adjusting said second arm to a zero point on said indicator.

4. The apparatus of claim 3 where said plunger is aligned substantially normal to said base, said securing means comprises a friction fit sleeve slidably mounted on said plunger in a direction substantially normal to said base.

5. The apparatus of claim 4 where said plunger is resiliently biased for holding said plunger against a container wall.

6. The apparatus of claim 4 where said plunger terminates in magnetic means for magnetically securing said plunger to a magnetically attractable container wall.

7. The apparatus of claim 6 where said plunger terminates in magnetic means for magnetically securing said plunger to a magnetically attractable container wall.

8. The apparatus of claim 7 where said base is mountable substantially parallel to the wall of a container.

9. The apparatus of claim 8 where said wall of a container comprises a container lid of a sealed container, said plunger being responsive to the bulging and contracting movement of said lid when said container is unsealed.

* * * * *